(12) United States Patent
Mejiritski et al.

(10) Patent No.: US 6,211,262 B1
(45) Date of Patent: Apr. 3, 2001

(54) CORROSION RESISTANT, RADIATION CURABLE COATING

(75) Inventors: Alexandre Mejiritski, Bowling Green; Thomas Marino, Toledo, both of OH (US); Violeta Lungu, Old Bridge, NJ (US); Dustin Martin, Monroe, MI (US); Douglas Neckers, Perrysburg, OH (US)

(73) Assignee: Spectra Group Limited, Inc., Maumee, OH (US)

( * ) Notice: Subject to any disclaimer, the term of this patent is extended or adjusted under 35 U.S.C. 154(b) by 0 days.

(21) Appl. No.: 09/294,492

(22) Filed: Apr. 20, 1999

Related U.S. Application Data

(60) Provisional application No. 60/082,424, filed on Apr. 20, 1998.

(51) Int. Cl.[7] ................................. C08F 2/48; C08F 2/50
(52) U.S. Cl. ............................. 522/71; 522/77; 522/81; 522/82; 522/79; 522/27; 522/53; 522/35; 522/100; 522/102; 522/109; 522/110; 522/111; 522/121
(58) Field of Search ................................. 522/81, 83, 82, 522/79, 77, 71, 109, 110, 111, 121, 27, 53, 35, 100, 122

(56) References Cited

U.S. PATENT DOCUMENTS

| | | | |
|---|---|---|---|
| 4,070,262 | 1/1978 | Guarino et al. | 204/159.24 |
| 4,071,425 | 1/1978 | Guarino et al. | 204/159.24 |
| 4,072,592 | 2/1978 | Due et al. | 204/159.15 |
| 4,244,989 * | 1/1981 | Noomen | 427/180 |
| 4,263,062 * | 4/1981 | Anzenberger | 148/6.15 |
| 4,264,363 * | 4/1981 | Cech | 106/14.28 |
| 4,386,173 * | 5/1983 | Chang | 523/453 |
| 4,495,225 * | 1/1985 | Cuiba et al. | 427/236 |
| 4,929,171 | 5/1990 | Hayashi et al. | 427/54.1 |
| 5,069,929 | 12/1991 | Arai et al. | 427/54.1 |
| 5,128,391 * | 7/1992 | Shustack | 522/92 |
| 5,244,957 * | 9/1993 | Best et al. | 524/418 |
| 5,354,372 * | 10/1994 | Ebayashi et al. | 106/271 |
| 5,407,471 * | 4/1995 | Rohr et al. | 106/14.44 |
| 5,451,343 | 9/1995 | Neckers et al. | 252/582 |
| 5,453,451 | 9/1995 | Sokol | 522/42 |
| 5,623,080 | 4/1997 | Neckers et al. | 549/393 |
| 5,639,802 | 6/1997 | Neckers et al. | 522/25 |
| 5,711,993 | 1/1998 | Lein et al. | 427/250 |
| 5,750,197 * | 5/1998 | van Ooij et al. | 427/318 |
| 5,976,419 * | 11/1999 | Hawkins et al. | 252/512 |
| 5,977,202 * | 11/1999 | Chawla et al. | 522/172 |
| 6,014,488 * | 1/2000 | Shustack | 385/128 |

OTHER PUBLICATIONS

Gardu, Rodica et al., "Relationship Between Pigment Structure and Film–Forming Characteristics of UV and Oven Dried Paints."

W. J. van Ooij, T. Child; Protecting metals with silane coupling agents; Feb. 1998.

* cited by examiner

Primary Examiner—James J. Seidleck
Assistant Examiner—Sanza L. McClendon
(74) Attorney, Agent, or Firm—Thompson Hine & Flory LLP

(57) ABSTRACT

A corrosion resistant coating for metal surfaces curable with actinic radiation. The blend uses acrylate resin, photoinitiator and a corrosion preventing agent such as a metal surface passivator, overbased calcium sulfonate/calcium carbonate, a barrier pigment, or a combination of two or more of these agents.

51 Claims, No Drawings

CORROSION RESISTANT, RADIATION CURABLE COATING

CROSS-REFERENCE TO RELATED APPLICATION(S)

This application claims priority from U.S. Provisional Application Serial No. 60/082,424 filed Apr. 20, 1998.

GOVERNMENT RIGHTS

This invention was made with Government support under Contract N00167-96-C-0046 awarded by the U.S. Department of Defense and the United States Government has certain rights in this invention.

BACKGROUND OF THE INVENTION

The present invention relates to corrosion resistant coatings for metal surfaces cured by the means of actinic radiation. These coatings are intended to protect metal surfaces in a variety of corrosive environments, and particularly, in a salt water environment.

Corrosion is an electrochemical process which leads to the deterioration and eventual destruction of exposed metal surfaces. The presence of conducting electrolyte, moisture and oxygen to successfully complete the electric circuit on the thermodynamically unstable metal surface are the main factors of a corrosion process. The mechanism of steel corrosion can be illustrated by a series of electrochemical reactions which involve iron (Fe), according to the mechanism outlined in "Corrosion Basics: An Introduction" published by NACE International, Houston 1984. Metal dissolution takes place at the anode in the course of the oxidation reaction:

$$Fe \rightarrow Fe^{2+} + 2e^- \qquad [1]$$

Released electrons can migrate to a cathodic site either through steel or via electrolyte. There they react with available water and oxygen. In neutral or basic conditions hydroxyl ions are produced:

$$2H_2O + O_2 + 4e^- \rightarrow 4OH^- \qquad [2]$$

Hydroxyl ions then recombine with ferrous ions producing corrosion products (red rust upon further oxidation):

$$Fe^{++} + 2OH^- \rightarrow Fe(OH)_2 \qquad [3]$$

One of the most efficient ways to thwart corrosion is to shield metal surfaces from the environment with protective coatings. These coatings are of great importance for numerous civilian and military uses. The range of applications is extremely broad: ship hulls and topside exterior surfaces; bridges and supports; various fuel, potable water, chemical and sewage tanks; numerous structural and building uses, etc.

The type and level of coating protection needed is determined by many factors including the environmental exposure conditions (salt water, UV, temperature, chemicals, oil and greases), use and handling of the part (toughness, scratch resistance, impact), service life, etc.

Over the years coatings based on alkyd, urethane, epoxy and other technologies have been developed. However, many of these coatings use organic solvents (VOC's, Volatile Organic Compounds) which present environmental, energy and safety concerns. For example, epoxy/amidoamine modified polyamide cured paints are discussed by Hare, "Protective Coatings" Technology Publishing Co. Pittsburgh, Pa. 1994. These paints reportedly give 6 years of service in marine immersion with slightly reduced service life in ballast tank areas. Water and corrosion resistance of these paints is attributed to a high degree of crosslinking and excellent adhesion to steel which prevents or significantly delays the corrosion process from starting. In addition, efficient corrosion protection can be attributed to good substrate wetting by the amide linkages and high peel strength. Epoxy/polyamide systems are easily recoatable and can be repeatedly cleaned without deterioration. However, these paints are solvents based, take long time to cure, require accurate two-part mixing, have a limited pot life, and their cure is temperature dependent. Consequently, new approaches in the coating industry to reduce VOC's are often driven by regulatory, environmental, productivity and related issues.

Recent and current efforts center around water based, powder, high solids, radiation cure and other coating technologies. Some of them have resulted in environmentally friendly coatings that meet many of the desired requirements.

SUMMARY OF THE INVENTION

This invention is directed to a novel approach of corrosion prevention based on corrosion resistant paints cured with actinic radiation (visible or UV light, etc.). Radiation cure is generally regarded as environmentally friendly, 100% solids essentially zero VOC technology. The coatings are applied as a premixed one-part system having very long pot life. Light sources are selected on the basis of the desired type of the actinic radiation and achieve very short cure times which allow for high productivity.

Developed formulations may or may not incorporate anti-corrosion fillers and may be acrylate or epoxy based. In the most common example of this invention the formulations are acrylate based. These coatings consist of oligomeric acrylate resins, monomeric diluents, various fillers and other additives which provide a balance of critical properties. Depending on the type of actinic radiation (UV or visible light) certain photoinitiators required for cure are selected. A blend of photoinitiators including Spectra Group Limited's H-NU 470 achieves tack-free cure using pulsed or continuous visible light sources.

Corrosion protection in salt water environment is achieved through improvement in adhesion and/or use of anti-corrosion fillers. Optimized paints exhibit good adhesion to metal, hydrophobicity, toughness, scratch resistance and other properties, and perform well under long term salt water immersion (SWIM) and salt fog (SF) testing.

In accordance with one embodiment of the invention, radiation curable, corrosion resistant compositions are provided which contain a silane adhesion promoter (e.g., see Examples 1 and 10), a metal surface passivator (e.g., see Example 2, 3 and 4), overbased calcium sulfonate complex (e.g., see Example 8) or a barrier pigment (e.g., see Example 7) or a combination of two or more of these agents. In accordance with a preferred embodiment of the invention, to further enhance the adhesion and anti-corrosion protection of the coatings, the compositions are formulated to minimize the stress which accompanies polymerization by incorporating a plasticizer or controlling the rate of polymerization or the extent of crosslinking to minimize shrinkage (e.g., see Examples 5 and 6).

In accordance with another embodiment of this invention, the radiation curable, corrosion resistant compositions can be utilized in conjunction with other conventional coatings (for example, as primers for paints).

DETAILED DESCRIPTION OF THE INVENTION

The filled protective coating consists of three major components: the polymeric matrix binder, the anti-corrosion fillers and the additives ("Protective Coatings" by C. H. Hare). The polymeric resin blend should exhibit excellent adhesion to metal, good mechanical properties and low shrinkage. Related, low induced stress in the cured film or the ability to dissipate stress is important. This issue is addressed in detail below. Minimal water permeability is favored as is hydrolytic stability of the polymer. The fillers provide the primary corrosion protection and are selected from among the materials which operate by one or several corrosion protection mechanisms. Compatibility between the resin blend and the fillers, acceptable filler wetting by the resin blend and hydrolytic stability of the polymer/filler interface is necessary to maintain coating integrity.

The unfilled protective coatings of the invention consist of two major components: the polymeric matrix binder and the additives, namely adhesion promoters. In this case, the adhesion promoters, and particularly, silane adhesion promoters, improve corrosion protection over the same resin binder without the adhesion promoters. Since it does not contain the fillers, these corrosion protective coatings are clear offering transparency when needed.

In most cases radiation curable coatings are produced either by a free-radical mechanism in an acrylate based matrix or by a cationic mechanism in an epoxy based matrix. Both systems have their advantages and disadvantages as discussed below.

A very wide selection of acrylate resins is available which allows for broad property and performance design. When optimized, acrylate cure is very fast, not temperature sensitive and, with proper photoinitiator selection under certain cure conditions, permits relatively thick cure of pigmented materials. The free-radical cure of acrylates is, however, inhibited by oxygen in the topmost layer. This becomes one the biggest drawbacks for the systems of this type, especially under visible light cure conditions. In order to produce tack-free coatings either an inert atmosphere or, more practically, careful photoinitiator selection is needed. In this invention tackfree visible light cure is achieved for both clear and highly pigmented acrylate coatings under isothermal (heat sink) conditions in a very short time when a specifically developed free radical photoinitiator package is used. Spectra Group Limited's H-NU 470 fluorone photoinitiator (5,7-diiodo-3-butoxy-6-fluorone) photoinitiator combined with an amine co-initiator (e.g., amine acrylate, Henkel 4770) provide exceptional depth of cure for highly pigmented coatings. For a discussion of these photoinitiators, U.S. Pat. Nos. 5,451,343 and 5,623,080 are incorporated herein by reference. Improved cure response with visible light in this invention is achieved using blends with other photoinitiators such as Irgacure 369 and isopropylthioxanthone (ITX).

Epoxy resins are known to exhibit good adhesion to metal in part because their shrinkage is low which results in low residual stress. This improves both dry and long term wet adhesion. In addition, epoxy resins are hard, tough, scratch resistant materials which can be made somewhat flexible by using other modifier resins. The mechanism of cationic UV radiation cure of epoxy resins is well established and relies on acid generation from the decomposition of commonly used sulfonium or iodonium salts. For a discussion of cationic cured epoxy formulations, see for example U.S. Pat. No. 5,639,802. The cure mechanism is not inhibited by oxygen, although it is inhibited by moisture (i.e., on-site moist surface condition) and basic materials (including some corrosion inhibitors) which act as acid scavengers. Also, cure of epoxy resins via radiation is generally slower than acrylates, is temperature sensitive and depth of cure can be limited especially for pigmented systems. In spite of these restrictions epoxy based formulations containing anti-corrosion agents of this invention can be cured using actinic radiation. Visible light cure was achieved using an iodonium salt combined with a sensitizer such as 2-isopropylthioxanthone (ITX) or 1-chloro-4-propoxythioxanthone (CPTX). This aspect of the invention may be particularly useful when curing conditions are thoroughly controlled such as in a manufacturing environment.

Formulation Discussion

The key to formulating acrylate based corrosion protective coatings is balancing a number of desired but often conflicting traits as summarized in Table 1. For example, materials that exhibit low crosslink density and are polar offer good adhesion, while water resistance requires high crosslink density and a nonpolar matrix.

TABLE 1

| Starting material properties/ Finished coating properties | Crosslink density | Polarity | Functionality | Filler loading | Viscosity | Molecular weight |
|---|---|---|---|---|---|---|
| Adhesion | low | polar | Low | low | — | — |
| Water resistance | high | nonpolar | High | high | — | high |
| Cure response | high | — | High | low | — | — |
| Film strength | high | polar | High | variable | — | high |
| Residual stress | low | — | Low | high | — | — |
| Flexibility | low | variable | Low | low | — | high |
| Ease of application | — | polar | — | low | Low | low |

It is a well known fact that acrylate materials shrink upon polymerization due to the volume changes as weaker, longer range bonds are replaced by stronger, shorter bonds (N. Ackam et al. Proc. RadTech Europe, 1995). It can be generally said that a high amount of shrinkage intrinsic to acrylates forming the film will lead to a high amount of stress the film contains upon formation (B. Magny et al. Proc. RadTech Europe, 1995). If the coating does not have any mechanisms of stress relaxation and the internal stress is too high, the coating may delaminate from the substrate in order to relieve the stress. Variations in relative humidity and temperature in the environment close to the coating may aggravate the amount of the internal stress.

In this invention we have demonstrated the following ways to maximize adhesion in the acrylate based coatings:
resin/pigment balance:
   maximizing pigment volume concentration (PVC) where possible;
resin selection:
   selecting low shrinkage type acrylate materials;
   using ethoxylated materials where possible;
   maximizing oligomeric content where possible;
   minimizing content of multifunctional acrylates;

varying cure parameters:
  lowering cure time to avoid overcure;
  increasing the distance between light source and the substrate;
plasticization/stress relief:
  utilizing fillers/resins capable of coating plasticization;
  utilizing dark pigments (both anti-corrosion fillers and/or dark colorants of various nature), thus reducing light penetration and degree of crosslinking;
  lowering photoinitiator concentration;
utilizing various adhesion promoters.

The makeup of the typical formulation for an acrylate based corrosion resistant paint is shown in Table 2.

TABLE 2

| Formulation component | Amount, weight % |
|---|---|
| Film forming oligomer + modifier | 15–40 |
| Diluent monomer(s) | 15–35 |
| Corrosion inhibitors | 25–70 |
| Amine coinitiator | 3–10 |
| Additives | 2 |
| Photoinitiators | 2–4 |

Resins for free-radical acrylate coatings

In general, the acrylate oligomeric resin system consists of one or several parts selected from the following classes:
  film forming oligomers, and
  modifier oligomers.

Film forming oligomers generally offer hard, strong films with good dry adhesion to metal along with excellent water and chemical resistance. However, their film flexibility can be low and modifier oligomers are often needed to help dissipate film stresses, decrease shrinkage and improve adhesion.

The following classes of oligomers may be selected as film forming oligomers:
  aliphatic and aromatic epoxy acrylates, namely modified and not modified bisphenol A epoxy acrylates, epoxy novolac acrylates, amine modified epoxy acrylates, fatty acid modified epoxy acrylates;
  urethane acrylates, namely modified and not modified aromatic urethane acrylates The following classes of oligomers may be selected as modifier oligomers:
  epoxy acrylates, namely epoxidized oil acrylates, such as epoxidized soy bean oil acrylate, epoxidized linseed oil acrylate, rubber modified epoxy acrylates, partially acrylated epoxides, such as partially acrylated bisphenol A;
  urethane acrylates, namely modified and not modified aliphatic urethane acrylates;
  acrylic acrylates;
  acrylated and methacrylated polybutadienes;
  others including non-reactive flexibilizers, namely natural oils, polyesters, polymerizable cellulosics, etc.

In one of the most preferred configurations of this invention, the oligomeric resin package contains epoxy novolac acrylate and acrylic acrylate oligomers.

Reactive Diluents

Reactive diluents are a vital portion of the coating since they decrease oligomer viscosity and contribute other important properties noted below. It is preferred that the selected diluents are monomeric since this will lead to lower shrinkage in the polymeric binder matrix. In general, diluents need to impart good mechanical properties with minimal shrinkage, high elongation and high tensile strength. It is preferred that the diluents be effective solvents for oligomers so that the lowest possible level can be used thus keeping the high molecular weight portion of the film at a maximum. The diluents should also possess low surface energy to improve pigment wetting during dispersion. Very often oligomers are already supplied diluted with certain diluents. If possible the choice should be made towards less water soluble diluents which would help provide maximum adhesion to metal. In addition, monomers with low Draize values can be selected in order to address health requirements.

The following diluents may be chosen from, but not limited to, the group of acrylates or methacrylates such as 2-phenoxyethyl acrylate, 1,6-hexanediol diacrylate, trimethylolpropane triacrylate, tripropylene glycol diacrylate, isobornyl acrylate, tetrahydrofurfuryl acrylate, octyl/decyl acrylate, nonyl phenol ethoxylated acrylate, stearyl acrylate, lauryl acrylate etc.

In one of the most preferred configurations of this invention, 2-phenoxyethyl acrylate is chosen as the monomeric diluent.

In addition, acid containing reactive monomers which promote adhesion to metal can be incorporated into the formulation. Examples include, but are not limited to, β-carboxyethyl acrylate (contains both acrylate and carboxy functionalities), acrylated and methacrylated acidic adhesion promoters (Ebecryl 168 and Ebecryl 170 from UCB Radcure), monofunctional acid ester (CD9050/Sartomer), trifunctional acid ester (CD9052/Sartomer), zinc diacrylate (CD9016/Sartomer), etc.

Amine Co-initiator

A photoinitiator blend including H-NU 470 and ITX requires the presence of amine functionality as co-initiator. This functionality may be introduced both in reactive and non-reactive oligomeric or monomeric forms. The following acrylated amines may be use, but not restricted to: amine modified bisphenol A acrylated epoxy, amine acrylate adduct of hexanediol diacrylate, amine acrylate adduct of tripropylene glycol diacrylate Tertiary amines such as dialkylanilines are also useful coinitiators, e.g., N,N-dimethyl-2,6-diisopropylaniline (for additional examples see U.S. Pat. No. 5,451,343).

Fillers

Anti-corrosion fillers can provide metal protection according to several different mechanisms:
  sacrificial cathode—less noble metal dissolves in place of metal under protection;
An example of this type of protection is Zn dust filled primers.
  barrier filler effect—regular shaped fillers and especially lamellar fillers force water to seek a circuitous path in a water resistant binder; these pigments otherwise also act as film reinforcers;
The following pigments are preferred, but not limited to, as barrier fillers:
  micaceous iron oxide—lamellar;
  acrylate surface treated glass flakes—lamellar;
  acrylate surface treated ceramic microspheres—spherical;
  aluminum flake, leafing and non-leafing—lamellar;
  vinyl surface treated talc—lamellar.

metal surface passivation—reinforcement, repair and formation of metal oxide film;

Complex inorganic pigments from the group chosen below may be used as metal surface passivators:

various chromates, zinc oxide core with zinc molybdate shell, mixed zinc oxide/Zn phosphate core with Zn molybdate shell, molybdate modified titanate surface treated zinc phosphate, micronized zinc phosphate, iron phosphate, zinc-barium phosphate, calcium phosphosilicate, strontium-zinc phosphosilicate, zinc-aluminum-calcium-strontium polyphosphate-silicate, zinc hydroxyphosphite, strontium phosphate, barium metaborate monohydrate, calcium metaborate, etc. The pigments in this group may be utilized either separately or in combination.

thixotropic overbased calcium sulfonate/calcium carbonate complex corrosion inhibitors supplied in naphthenic oil—sulfonium active complexes, combination of barrier effect, increasing pH, improved adhesion, hydrophobicity, stress relief by plastisization;

These complexes can be represented by the general formula:

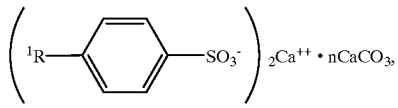

where
R$^1$ is the alkyl group.

oxygen scavengers—by consuming oxygen deprive cathodic reaction (2) of the fuel;

The examples may include, but are not limited to, iron activated materials such as ferric oxide and other iron materials (Mitsubishi Gas Chemical); a novel polyester resin (Amosorb® 3000/Amoco); metaxylenediamine nylon resin (MXD6/Mitsubishi Gas Chemical).

extenders—help in film buildup;

The examples may include, but not limited to, various types of silica (fused, amorphous, crystoballite, surface treated, etc.), methacrylate, epoxy or amine surface treated wollastonite (calcium metasilicate), calcium carbonate, barium sulfate, etc. These pigments are not active anti-corrosion fillers as a separate entity, but may give rise to anti-corrosion synergism if used in conjunction with metal surface passivators (i.e., wollastonite and zinc phosphate).

Metal surface passivators and overbased calcium sulfonate complex anti-corrosion fillers have been found to be particularly useful in accordance with the invention. Anti-corrosion fillers providing protection via different mechanism may be combined in the protective coatings of the invention. In one embodiment zinc phosphate is used in combination with a wollastonite (preferably a surface treated wollastonite to improve its affinity for the coating).

The filler loading is one of the most important parameters since the film properties and performance are greatly dependent on the PVC/CPVC (pigment volume concentration/critical pigment volume concentration) ratio. A high PVC/CPVC ratio leads to less amount of resin present in the coating which, in turn, leads to the lower internal stress. However, PVC/CPVC ratio should not exceed 1 since the film becomes porous and extremely permeable. Preferably the PVC/CPVC ratio is about 0.4 to 0.8.

Additives

Appropriate care has to be exercised during mixing to uniformly distribute the fillers to avoid agglomeration, flocculation and air entrapment. After the coating is deposited on the substrate wetting and film distribution is crucial in determining the performance. Additives are commonly used in the fully formulated system to ensure pigment wetting and dispersion, substrate wetting, defoaming, film flow and leveling.

Other additives promoting adhesion or preventing corrosion play an extremely important role in coating performance. These include, but are not limited to:

volatile corrosion inhibitors, such as dicyclohexylamine nitrite and cyclohexylamine carbonate, etc. available for example from Cortec Corporation;

liquid corrosion inhibitor, such as (2-benzothiazolylthio)-succinic acid amine salt available from Ciba-Geigy Corporation;

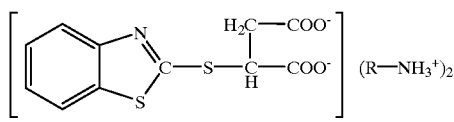

metal adhesion promoters available from CHARTWELL Co. of the general formula

where
M—proprietary metal(s);
X—organofunctional group which may be represented by primary amine, methacrylate, carboxylate, primary or secondary amine functionality;

n=1–10.

silane adhesion promoters of the general formula (available for example from Witco OSi Specialties):

where
R$^2$—is methyl or ethyl;
n=0–7, most often n=3;
X'—organofunctional group which may be represented by alkyl (methyl, vinyl), methacryloxy, glycidoxy, N-phenylamino, mercapto, primary or secondary amine functionality.

Silane adhesion promoters have proven to be particularly advantageous for addition to the compositions of the invention. Silane adhesion promoters may be utilized by both direct adding them to the fully formulated liquid coating precursor (integral blend) or pretreating the metal surface to be coated with dilute solution of silane adhesion promoters in alcohol, water or mixture thereof (prewash) similarly to the conditions described by W. J. van Ooij in Chemtech, February 1998. In the latter method the formed silane film acts as the tie-coat between metal substrate and the protective coating of the invention. X' is preferably N-phenylamino for the integral blend method of silane incorporation. X' is preferably methacryloxy for the prewash method of silane incorporation. Silane adhesion promoters can be utilized in compositions containing anti-corrosion fillers as well as unfilled protective coatings and, as illustrated in Example 10 below, silane adhesion promoters are particularly effective when used in combination with other additives and anti-corrosion fillers.

Resins for Cationic Epoxy Coatings

In general, while some of the same balancing formulation issues discussed under acrylate based corrosion protective coatings are applicable for epoxy formulation development, there are some distinct differences. For example, resin shrinkage and related stress relief is not as important for epoxy formulations as it is for acrylate formulations. Epoxy resins also exhibit inherently better metal adhesion than acrylates.

The epoxy resin system consists of one or several parts selected from the following classes:

film forming resins, and modifier resins.

Film forming resins generally offer hard, tough films with good adhesion to metal along with excellent water and chemical resistance and other properties. However, resin viscosity can be high and film flexibility can be low necessitating use of modifier resins.

The following classes of epoxy resins may be considered as film forming resins, but are not limited to:

glycidyl ether of Bis phenol A, glycidyl ether of Bis phenol F, epoxy novalacs, cycloaliphatic epoxy derivatives, epoxidized polybutadienes, cardanol-based epoxies, and brominated epoxies.

Modifier resins for epoxy resins are used to improved film flexibility, impact and peel strength, wetting, adhesion and to increase crosslinking.

The following classes of epoxy modifier resins may be considered, but are not limited to:

rubber modified liquid epoxy resins, epoxidized soy bean oils, mono and polyfunctional glycidyl ethers, polyols, polyether diols, elastomer modified resins, and hydrogenated and epoxidized polybutadiene.

Reactive Diluents for Cationic Epoxy Coatings

Reactive diluents are often used to lower resin viscosity, reduce surface tension leading to improved wetting and adhesion, and to increase cure speed. They can also be used to improve film flexibility.

The following class of epoxy reactive diluents may be considered, but not limited to:

mono and polyfunctional glycidyl ethers, alkyl glycidyl ethers, aromatic glycidyl ethers, vinyl ethers and mixed cycloaliphatic epoxides.

Similar principles for selection of anti-corrosion fillers and additives discussed above for the free-radical acrylate coatings apply in the case of the cationic epoxy coatings.

Light Source

The choice of the light source depends on the type of the actinic radiation chosen for the curing process. Standard medium pressure mercury arc lamps or otherwise doped mercury arc lamps can be used in order to cure corrosion resistant coatings with UV light. Pulsed (i.e., xenon pressurized lamps) or continuous (i.e., sulfur bulb) visible light sources can be used in order to cure corrosion resistant coatings with visible light. Other visible light sources include metal halide and tungsten halogen light sources.

In one of the most preferred embodiments of this invention, corrosion resistant coatings are cured with a pulsed xenon pressurized visible light source. This light source emits light above 370 nm and allows thick (i.e, 4–7 mils) tack-free isothermal cure in 4×6" area in 40 seconds or less.

Sample Preparation and Testing

In all examples outlined below the following sample preparation and testing was employed. Liquid coating precursors were applied on steel panels by brushing. Coating samples were cured on 3×6 inch ground steel Q-panels after they were precleaned according to the procedure outlined by B. S. Skerry et al. in Journal of Coatings Technology, 1990. During cure the panel was positioned on a heat sink. The distance between the panel and xenon pressurized visible light source can be varied. Generally, a single coating was 4–7 mils in thickness. If a second coat was necessary it was applied immediately upon curing of the bottom coat. Adhesion and impact resistance testing on original dry coatings was performed 24 hrs after curing according to ASTM D3359 and D2794, respectively. In addition, dry adhesion was evaluated by scratching the coating with a spatula according to a self-designated ranking (1—poor, 3—good, 5—excellent). Static salt water immersion testing (SWIM) was conducted by immersing the panels into 2.5% wt of "Instant Ocean" salt solution in tap water at room temperature. Coating appearance and blister formation was checked periodically. Blister size and density was evaluated according to ASTM D714 and D1654. Salt fog exposure (SF) was conducted according to ASTM B117. After both SF and SWIM exposure the part of the coatings which could easily be stripped were removed from the panels to evaluate the amount of remaining adhesion, the amount of formed rust and other features.

The invention is illustrated in more detail by the following non-limiting examples. Unless otherwise indicated all compositions are expressed in % by weight.

EXAMPLE 1

As can be seen from the data below adding 1 wt % of silane adhesion promoter significantly increases adhesion and delays rust formation in both SWIM and SF.

TABLE 3

| Components | Trade name/ manufacturer | Formulation A, wt % | Formulation AYI, wt % | Formulation AG1, wt % |
|---|---|---|---|---|
| Acrylic acrylate oligomer | Ebecryl 745/ UCB Radcure | 36.5 | 36.5 | 36.5 |
| 2-phenoxyethyl acrylate monomer | SR 339/ Sartomer | 43.8 | 43.8 | 43.8 |
| Epoxy novolac acrylate oligomer | Ebecryl 639/ UCB Radcure | 14.7 | 14.7 | 14.7 |
| Amine co-initiator | Photomer 4770/Henkel | 5 | 5 | 5 |
| Photoinitiator package: | | | | |
| H-NU 470 | Spectra Group | 0.05 | 0.05 | 0.05 |
| Irgacure 369 | Ciba | 2 | 2 | 2 |
| ITX | First Chemical | 2 | 2 | 2 |
| N-phenyl-γ--aminopropyltrimethoxy silane | Silquest Y9669 Witco OSi Specialties | — | 1 | — |
| γ-glycidoxypropyltri methoxy silane | Silquest A187 Witco OSi Specialties | — | — | 1 |

TABLE 4

| | Performance | | | |
|---|---|---|---|---|
| | SWIM, 21 days | | SF, 500 hrs | |
| Formulation | % area adhesion remaining | % area rust formed | % area adhesion remaining | % area rust formed |
| A | 10 | 75 | 0 | 60 |
| AY1 | 75 | 7 | 2 | 5 |
| AG1 | 85 | 2 | — | — |

EXAMPLE 2

As can be seen from the data below the presence of metal surface passivators significantly increases the amount of adhesion remaining and decreases the amount of formed rust.

TABLE 5

| Components | Trade name/ manufacturer | Formulation A, wt % | Formulation SZP, wt % | Formulation whbl, wt % |
|---|---|---|---|---|
| Acrylic acrylate oligomer | Ebecryl 745/ UCB Radcure | 36.5 | 18.6 | 20 |
| 2-phenoxyethyl acrylate monomer | SR 339/ Sartomer | 43.8 | 22.3 | 24 |
| Epoxy novolac acrylate oligomer | Ebecryl 639/ UCB Radcure | 14.7 | 7.4 | 10 |
| Amine co-initiator | Photomer 4770/ Henkel | 5 | 3.75 | 6 |
| Photoinitiator package: | | | | |
| similar to example #1 | — | Total 4.05 | total 2.11 | total 2.43 |
| Strontium-zinc phosphosilicate | SZP-391/ Halox | — | 48 | — |
| Blend: | — | — | — | total 40 |
| Zinc oxide/Zinc molybdate | Molywhite101 /Sherwin-Williams | | | 21.7 |
| Surface treated Zinc phosphate | J0806/Mineral Pigments | | | 10.8 |
| Ceramic microspheres | Zeeospheres W410/3M | | | 5 |
| Micronized wax | Aquabead 519/ Micropowders | | | 2.5 |
| Additive package: | | Total 1.84 | total 1.84 | total 1.84 |
| Dispersant | Solsperse 24000/ Zeneca | 0.46 | 0.46 | 0.46 |
| Flow and leveling | BYK-358/ BYK-Chemie | 0.46 | 0.46 | 0.46 |
| Surfactant | FC-171/3M | 0.46 | 0.46 | 0.46 |
| Defoamer | A-501/BYK-Chemie | 0.46 | 0.46 | 0.46 |

TABLE 6

| | Performance | | | |
|---|---|---|---|---|
| | SWIM | | SF, 500 hrs | |
| Formulation | % area adhesion remaining | % area rust formed | % area adhesion remaining | % area rust formed |
| A | 10 (21 days) | 75 (21 days) | 0 | 60 |
| SZP | 82 (50 days) | 5 (50 days) | 60 | 5 |
| whbl | 5 (50 days) | 5 (50 days) | 0 | 10 |

EXAMPLE 3

The choice of the anti-corrosion filler significantly influences the performance of the protective coating. Different anti-corrosion fillers were substituted into the generic formulation outlined below. Difference in remaining adhesion and rust formation after 50 days of SWIM are shown in Table 8.

TABLE 7

| Components | Trade name/ manufacturer | Generic formulation |
|---|---|---|
| Acrylic acrylate oligomer | Ebecryl 745/ UCB Radcure | Polymer matrix weight ratio 2.5:3:1 |
| 2-phenoxyethyl acrylate monomer | SR 339/ Sartomer | Polymer matrix weight ratio 2.5:3:1 |
| Epoxy novolac acrylate oligomer | Ebecryl 639/ UCB Radcure | Polymer matrix weight ratio 2.5:3:1 |
| Amine co-initiator | Photomer 4770/ Henkel | 3.75 wt % |
| Photoinitiator package: | | |
| similar to example #1 | — | 4.05 × wt % of polymer matrix |
| Additive package: | | |
| similar to example #2 | — | total 1.84 wt % |
| Anti-corrosion filler | see below | PVC/CPVC = 0.46 |

Anti-corrosion fillers:

MW101—Molywhite 101/Sherwin-Williams, zinc oxide core with zinc molybdate shell;

MZAP—Molywhite MZAP/Sherwin-Williams, mixed zinc oxide/zinc phosphate core with Zn molybdate shell;

J0806—PhosguardJ0806/Mineral Pigments, molybdate modified titanate surface treated zinc phosphate;

J0853—PhosguardJ0853/Mineral Pigments, micronized zinc phosphate;

J0813—PhosguardJ0813/Mineral Pigments, mixed zinc and iron phosphate;

J0866—PhosguardJ0866/Mineral Pigments, mixed zinc and barium phosphate;

X263—Zeeospheres X263/3M, surface treated ceramic microspheres;

CW491—Halox CW-491/Halox, calcium phosphosilicate;

SZP391—Halox SZP-391/Halox, mixed strontium and zinc phosphosilicate;

ZCPP—Heubach ZCPP/Heubach, mixed zinc, aluminum, calcium and strontium polyphosphate-silicate;

Nalzin 2—Nalzin 2/Rheox, zinc hydrophosphite;

Sr phosph—Sr phosphate/Nichem, strontium phosphate;
Bus11-M1—Busan 11-M1/Buckman, barium metaborate monohydrate;
Butr9119—Butrol 9119/Buckman, calcium metaborate;
Sil AM2050—ActiMin 2050/, surface treated crystobalite;
Silt44—Siltex 44/, fused amorphous silica;
Sil MS30—Min-U-Sil 30/, crystalline silica, quartz.

TABLE 8

| Anti-corrosion filler | Performance SWIM, 50 days | |
| --- | --- | --- |
| | % area adhesion remaining | % area rust formed |
| J0813 | 98 | 1 |
| J0853 | 98 | 1 |
| Nalzin2 | 88 | 7 |
| SZP | 82 | 5 |
| J0866 | 77 | 10 |
| J0806 | 75 | 5 |
| MZAP | 70 | 8 |
| ZCPP | 67 | 5 |
| X263 | 65 | 20 |
| CW491 | 50 | 30 |
| Butr9119 | 43 | 65 |
| Bus11M1 | 42 | 40 |
| MW101 | 35 | 12 |
| Sil AM2050 | 26 | 50 |
| Silt44 | 22 | 2 |
| Sil MS30 | 10 | 45 |
| Sr phosph | 0 | 100 |

EXAMPLE 4

As can be seen from the data below 50/50 blend of methacrylate treated Wollastonite and zinc phosphate leads to performance improvement in the protective coatings of the invention.

TABLE 9

| Components | Trade name/ Manufacturer | Formulation whbl, wt % | Formulation WollB, wt % |
| --- | --- | --- | --- |
| Acrylic acrylate oligomer | Ebecryl 745/ UCB Radcure | 20 | 21.6 |
| 2-phenoxyethyl acrylate monomer | SR 339/ Sartomer | 24 | 25.9 |
| Epoxy novolac acrylate oligomer | Ebecryl 639/ UCB Radcure | 10 | 8.7 |
| Amine co-initiator | Photomer 4770/ Henkel | 6 | 3.75 |
| Photoinitiator package: | | | |
| similar to example #1 | — | Total 2.43 | total 2.43 |
| Blend: | | Total 40 | total 42.5 |
| Zinc oxide/Zinc molybdate | Molywhite101/ Sherwin-Williams | 21.7 | — |
| Surface treated Zinc phosphate | J0806/Mineral Pigments | 10.8 | 20 |
| Ceramic microspheres | Zeeospheres W410/3M | 5 | — |
| Micronized wax | Aquabead 519/ Micropowders | 2.5 | 2.5 |
| Methacrylate surface treated wollastonite (calcium metasilicate) | 10WCWollastocup/ NYCO | — | 20 |

TABLE 9-continued

| Components | Trade name/ Manufacturer | Formulation whbl, wt % | Formulation WollB, wt % |
| --- | --- | --- | --- |
| Additive package: | | | |
| similar to example #2 | — | Total 1.84 | total 1.84 |

TABLE 10

| Formulation | Performance | | | |
| --- | --- | --- | --- | --- |
| | SWIM | | SF, 200 hrs | |
| | % area adhesion remaining | % area rust formed | % area adhesion remaining | % area rust formed |
| WollB | 50 (50 days) | 10 (50 days) | 45 | 5 |
| whbl | 5 (50 days) | 5 (50 days) | 20 | 5 |

EXAMPLE 5

As can be seen from the data below higher PVC/CPVC leads to improvement in performance in the protective coatings of the invention.

TABLE 11

| Components | Trade name/ manufacturer | Formulation WollC, wt % | Formulation Woll50, wt % | Formulation WollB, wt % |
| --- | --- | --- | --- | --- |
| Acrylic acrylate oligomer | Ebecryl 745/ UCB Radcure | 13.9 | 18.1 | 21.6 |
| 2-phenoxyethyl acrylate monomer | SR339/ Sartomer | 16.7 | 21.7 | 25.9 |
| Epoxy novolac acrylate oligomer | Ebecryl 639/ UCB Radcure | 5.6 | 7.3 | 8.7 |
| Amine co-initiator | Photomer 4770/ Henkel | 3.75 | 3.75 | 3.75 |
| Photoinitiator package: | | | | |
| similar to example #1 | — | Total 1.62 | total 2.01 | tot 2.43 |
| Blend: | | Total 60 | total 50 | total 42.5 |
| Surface treated Zinc phosphate | J0806/Mineral Pigments | 28.75 | 23.75 | 20 |
| Micronized wax | Aquabead 519/ Micropowders | 2.5 | 2.5 | 2.5 |
| Methacrylate suface treated wollastonite (calcium metasilicate) | 10WCWollastocup/NYCO | 28.75 | 23.75 | 20 |
| Additive package: | | | | |
| similar to example #2 | — | Total 1.84 | | total 1.84 |
| PVC/CPVC | — | 0.76 | 0.6 | 0.46 |
| Viscosity/ paintability | — | High/difficult | medium/ easy | low/ easy |

TABLE 12

| Formulation | Performance | | | |
|---|---|---|---|---|
| | SWIM | | SF, 1000 hrs | |
| | % area adhesion remaining | % area rust formed | % area adhesion remaining | % area rust formed |
| WollB | 50 (50 days) 5 (120 days) | 10 (50 days) 20 (120 days) | 0 | 55 |
| Woll50 | 78 (50 days) 72 (120 days) | 10 (50 days) 5 (120 days) | 30 | 2 |
| WollC | 95 (50 days) 90 (120 days) | 2 (50 days) 5 (120 days) | 90 | 5 |

EXAMPLE 6

Phosguard J0813 in addition to being an anti-corrosion filler is a dark pigment. As can be seen from the data shown below addition of small quantities of dark pigment leads to positive influence on performance by reducing film shrinkage.

TABLE 13

| Formulation | Performance | | | |
|---|---|---|---|---|
| | SWIM | | SF, 500 hrs | |
| | % area adhesion remaining | % area rust formed | % area adhesion remaining | % area rust formed |
| WollB as in example #4, 5 | 50 (50 days) 5 (120 days) | 10 (50 days) 20 (120 days) | 0 | 55 |
| WollB + 5% J0813 | 90 (50 days) 65 (120 days) | 2 (50 days) 5 (120 days) | 75 | 5 |
| SZP as in example #2 | 82 (50 days) 1 (120 days) | 5 (50 days) 8 (120 days) | 60 | 5 |
| SZP + 5% J0813 | 85 (50 days) 20 (120 days) | 6 (50 days) 7 (120 days) | 65 | 5 |

EXAMPLE 7

As can be seen from the data below addition of 25 wt % of micaceous iron oxide as a barrier pigment leads to an improvement in salt fog performance.

TABLE 14

| Components | Trade name/ manufacturer | Formulation A, wt % | Formulation MIOX, wt % |
|---|---|---|---|
| Acrylic acrylate oligomer | Ebecryl 745/ UCB Radcure | 36.5 | 27.4 |
| 2-phenoxyethyl acrylate monomer | SR339/ Sartomer | 43.8 | 32.9 |
| Epoxy novolac acrylate oligomer | Ebecryl 639/ UCB Radcure | 14.7 | 11 |
| Amine co-initiator | Photomer 4770/ Henkel | 5 | 3.75 |
| Photoinitiator package: | | | |
| similar to example #1 | — | total 4.05 | Total 3.04 |
| Micaceous iron oxide | MIOX SG/ Kraft | — | 25 |

TABLE 14-continued

| Components | Trade name/ manufacturer | Formulation A, wt % | Formulation MIOX, wt % |
|---|---|---|---|
| Additive package: | | | |
| similar to example #2 | — | — | Total 1.84 |

TABLE 15

| Formulation | Performance SF, 500 hrs no scribe | |
|---|---|---|
| | % area adhesion remaining | % area rust formed |
| A | 5 | 50 |
| MIOX | 25 | 10 |

EXAMPLE 8

As can be seen from the data below addition of overbased calcium sulfonate/calcium carbonate complex significantly increases adhesion and decreases rust formation, especially in SF testing, in the protective coatings of this invention.

TABLE 16

| Components | Trade name/ manufacturer | Formulation A, wt % | Formulation whbl, wt % | Formulation SACI, wt % | Formulation SACI50, wt % | Formulation SACI60, wt % |
|---|---|---|---|---|---|---|
| Acrylic acrylate oligomer | Ebecryl 745/ UCB Radcure | 36.5 | 20 | 27.4 | 18 | 12.3 |
| 2-phenoxyethyl acrylate monomer | SR 339/ Sartomer | 43.8 | 24 | 32.9 | 21.7 | 14.7 |
| Epoxy novolac acrylate oligomer | Ebecryl 639/ UCB Radcure | 14.7 | 10 | 11 | 7.3 | 5 |
| Amine co-initiator | Photomer 4770/ Henkel | 5 | 6 | 3.75 | 3 | 3 |
| Photoinitiator package: similar to example #1 | — | total 4.05 | total 2.43 | total 3.04 | total 2.03 | total 1.62 |
| Blend: | | — | total4 | — | total 25 | total 40 |
| Zinc oxide/Zinc molybdate | Molywhite10 1/ Sherwin-Williams | | 0 21.7 | | 10.5 | 23.1 |
| Surface treated Zinc phosphate | J0806/ Mineral Pigments | | 10.8 | | 8.9 | 11.5 |
| Ceramic microspheres | Zeeospheres W410/3M | | 5 | | 5.6 | 5.4 |
| Micronized wax | Aquabead 519/ Micro-powders | | 2.5 | | — | — |
| Overbased calcium sulfonate/calcium carbonate complex | SACI 200/ Stony Creek Technologies | — | — | 25 | 25 | 25 |
| Additive package: similar to | — | — | total 1.84 | total 1.84 | total 1.84 | total 1.84 |

TABLE 16-continued

| Components | Trade name/ manufacturer | Formulation A, wt % | Formulation whbl, wt % | Formulation SACI, wt % | Formulation SACI50, wt % | Formulation SACI60, wt % |
|---|---|---|---|---|---|---|
| example #2 | | | | | | |

TABLE 17

| | Performance | | | |
|---|---|---|---|---|
| | SWIM | | SF, 1000 hrs | |
| Formulation | % area adhesion remaining | % area rust formed | % area adhesion remaining | % area rust formed |
| A | 10 (21 days) | 75 (21 days) | 0 | 100 |
| whbl | 5 (50 days) | 5 (50 days) | 0 | 40 |
| SACI | 15 (50 days) | 35 (50 days) | 75 | 15 |
| SACI50 | 25 (50 days) | 25 (50 days) | 80 | 15 |
| SACI60 | 98 (120 days) | 2 (120 days) | 98 | 1 |

EXAMPLE 9

Addition of Volatile Corrosion Inhibitors (VCI) to some of SACI containing formulations leads to performance improvement.

TABLE 18

| | Performance | | | |
|---|---|---|---|---|
| | SWIM | | SF, 1000 hrs | |
| Formulation | % area adhesion remaining | % area rust formed | % area adhesion remaining | % area rust formed |
| SACI as in example #8 | 15 (50 days) | 35 (50 days) | 75 | 15 |
| SACI + 2 wt % VCI M415/Cortec | 61 (75 days) | 18 (75 days) | 90 | 8 |

EXAMPLE 10

Addition of a small amount of silane adhesion promoter directly into the fully formulated liquid coating precursor (integral blend) significantly improves performance of the wide variety of formulations.

TABLE 19

| | Performance | | | |
|---|---|---|---|---|
| | SWIM | | SF, 1000 hrs | |
| Formulation | % area adhesion remaining | % area rust formed | % area adhesion remaining | % area rust formed |
| SACI as in example #8 | 15 (50 days) | 35 (50 days) | 75 | 15 |
| SACI + 1 wt % Y9669 as in example #1 | 75 (50 days) 55 (120 days) | 55 (50 days) 45 (120 days) | 60 | 15 |
| SACI 50 as in example | 25 (50 days) | 25 (50 days) | 80 | 15 |
| SACI 50 + 1 wt % Y9669 | 88 (50 days) 55 (50 days) | 20 (50 days) 8 (120 days) | 90 | 7 |
| Woll B as in example #4 | 50 (50 days) 5 (120 days) | 10 (50 days) 20 (120 days) | 0 | 55 |
| Woll B + 1 wt % Y9669 | 75 (50 days) 8 (120 days) | 8 (50 days) 20 (120 days) | 15 | 8 |
| Woll50 as in example #5 | 78 (50 days) 72 (120 days) | 10 (50 days) 5 (120 days) | 30 | 2 |
| Woll50 + 1 wt % Y9669 | 92 (50 days) 75 (120 days) | 2 (50 days) 10 (120 days) | 70 | 12 |
| SZP as in example #2 | 82 (50 days) 1 (120 days) | 5 (50 days) 8 (120 days) | 60 (200 hrs) | 5 (200 hrs) |
| SZP + 1 wt % Y9669 | 93 (50 days) 30 (120 days) | 2 (50 days) 15 (120 days) | 85 (200 hrs) | 8 (200 hrs) |

EXAMPLE 11

As can be seen in data from Table 20 silane adhesion promoters (γ-methacrylatopropyltrimethoxy silane Silquest A-174/Witco OSi Specialties) can be applied as a dilute solution (1 wt %) pretreatment on the metal surface using a variety of solvents (prewash). Coating performance (formulation whbl similar to example #2) after prewash application is significantly improved.

TABLE 20

| Prewash type | Performance SWIM, 21 days % area adhesion remaining |
| --- | --- |
| Formulation whbl-control | 12 |
| Water | 90 |
| Water acidified (ph~5.5) | 80 |
| Isopropyl alcohol | 84 |
| Isopropyl alcohol/water blend | 80 |

EXAMPLE 12

As can be seen from the data below a cationic epoxy based formulation containing corrosion resistant fillers display improved protection against corrosion in SF.

TABLE 21

| Component | Trade name/Manufacturer | Formulation Ep cl, wt % | Formulation Ep whbl, wt % |
| --- | --- | --- | --- |
| Epoxidized bisphenol A | EPON 828/Shell | 75 | 56.2 |
| Epichlorohydrin castor oil based epoxy modifier | Heloxy 505/Shell | 25 | 18.8 |
| Blend: | | — | total 25 |
| Zinc oxide/Zinc molybdate | Molywhite101/ Sherwin-Williams | | 9.5 |
| Surface treated Zinc phosphate | J0806/Mineral Pigments | | 8 |
| Ceramic microspheres | Zeeospheres W410/3M Aquabead 519/ Micropowders | | 5 |
| Micronized wax | | | 2.5 |
| Additive package similar to example #2 | — | Total 1.38 | total 1.38 |
| Photoinitiator package: | | | total 2.625 |
| CPTX Quantacure CD1012 | Great Lakes Chemical | 1 | 0.75 |
| | Sartomer | 2.5 | 1.875 |

TABLE 22

| | Performance SF, 500 hrs | |
| --- | --- | --- |
| Formulation | % area adhesion remaining | % area rust formed |
| Epcl | 0 | 100 |
| Ep whbl | 40 | 7 |

What is claimed is:

1. A corrosion resistant coating for metal surfaces curable with actinic radiation comprising a blend of acrylate resin, photoinitiator and a corrosion preventing agent selected from the group consisting of a metal surface passivator, overbased calcium sulfonate/calcium carbonate, a barrier pigment, or a combination of two or more of these agents.

2. The coating of claim 1 comprising about 15 to 40% by weight of said acrylate resin.

3. The coating of claim 2 wherein said acrylate resin consists of film forming oligomer and modifier oligomer.

4. The coating of claim 3 wherein said composition includes a modifier oligomer selected from the group consisting of acrylic acrylate, urethane acrylate, acrylated epoxidized soy bean oil, aliphatic polyether urethane acrylate, acrylated and methacrylated polybutadiene and mixtures thereof.

5. The coating of claim 3 wherein said composition includes a film forming oligomer selected from the group consisting of epoxy bisphenol A acrylate, epoxy novalac acrylate, fatty acid modified epoxy acrylate, aromatic urethane acrylate, and mixtures thereof.

6. The coating of claim 3 wherein said modifier oligomer of the acrylate resin is rubber modified.

7. The coating of claim 1 comprising about 15 to 35% by weight of a reactive, non-reactive or acidic adhesion promoting diluent.

8. The composition of claim 7 wherein said composition includes a reactive, non-reactive or acidic adhesion promoting diluent selected from the group consisting of 2-phenoxyethyl acrylate, hexanediol diacrylate, trimethylolpropane triacrylate, tripropylene glycol diacrylate, isobornyl acrylate, tetrahydrofurfuryl acrylate, octyl/decyl acrylate, nonyl phenol ethoxylated acrylate, stearyl acrylate, lauryl acrylate, -carboxyethyl acrylate, acrylated and methacrylated acidic adhesion promoters, monofunctional acid ester, trifunctional acid ester, zinc diacrylate, natural oils, polyesters, polymerizable cellulosics, and mixtures thereof.

9. The coating of claim 1 wherein said composition additionally contains a silane adhesion promoter.

10. The coating of claim 1 wherein said composition contains overbased calcium sulfonate.

11. The coating of claim 1 where said composition contains a metal surface passivator selected from the group consisting of zinc oxide core with zinc molybdate shell, mixed zinc oxide/Zn phosphate core with Zn molybdate shell, molybdate modified titanate surface treated zinc phosphate, micronized zinc phosphate, iron phosphate, zinc-barium phosphate, calcium phosphosilicate, strontium-zinc phosphosilicate, zinc hydroxyphosphite, strontium phosphate, barium metaborate monohydrate, calcium metaborate, chromates, or mixtures thereof.

12. The coating of claim 10 wherein said sulfonate is overbased calcium sulfonate/calcium carbonate complex in a dispersing oil at 5 to 50% by weight.

13. The coating of claim 11 further comprising one or more extenders selected from the group consisting of untreated and surface treated calcium metasilicate (wollastonite), untreated and surface treated silica, calcium carbonate and barium sulfate.

14. The coating of claim 13 wherein the anti-corrosion agent is a mixture of surface treated calcium metasilicate (wollastonite) and zinc phosphate.

15. The coating of claim 14 wherein the anti-corrosion agent is a mixture which includes up to about 10% by weight of a dark pigment.

16. The coating of claim 1 further comprising about 2 to 10% by weight of an amine or an amine acrylate coinitiator.

17. The coating of claim 1 wherein said composition contains about 2 to 4% by weight of UV and/or visible light photoinitiators.

18. The coating of claim 17 wherein said photoinitiators include a fluorone, isopropylthioxanthone (ITX) or its derivatives.

19. The coating of claim 9 wherein said silane adhesion promoter is present in an amount of about 0.1 to 5% by weight.

20. The coating of claim 14 wherein the ratio of pigment volume concentration to critical pigment volume concentration is less than 1.

21. The coating of claim 20 wherein the ratio of pigment volume concentration to critical pigment volume concentration is about 0.4 to 0.8.

22. A corrosion resistant coating for metal surfaces curable with actinic radiation comprising a blend of cationically curable epoxy resin, photoinitiators and a corrosion preventing agent selected from the group consisting of a metal surface passivator, overbased calcium sulfonate/calcium carbonate, a lamellar barrier pigment, or a combination of two or more of these agents.

23. The coating of claim 22 comprising about 25 to 75% by weight of said cationically curable epoxy resin.

24. The coating of claim 23 wherein said cationically curable epoxy resin consists of film forming oligomer and modifier oligomer.

25. The coating of claim 24 wherein said modifier oligomer is selected from the group consisting of rubber modified liquid epoxy resins, epoxidized soy bean oils, mono and polyfunctional glycidyl ethers, polyols, polyether diols, elastomer modified resins, and hydrogenated and epoxidized polybutadiene.

26. The coating of claim 24 wherein said film forming oligomer is selected from the group consisting of glycidyl ether of Bis phenol A, glycidyl ether of Bis phenol F, epoxy novalacs, cycloaliphatic derivatives, epoxidized polybutadienes, cardanol-based epoxies, and brominated epoxies.

27. A corrosion resistant coating of claim 22 comprising about 0 to 25% by weight of an epoxy modifier diluent.

28. The coating of claim 27 wherein said epoxy modifier diluent selected from the group consisting of mono and polyfunctional glycidyl ethers, alkyl glycidyl ethers, aromatic glycidyl ethers, vinyl ethers and mixed cycloaliphatic epoxides.

29. A corrosion resistant coating of claim 22 wherein said composition additionally contains a silane adhesion promoter.

30. The coating of claim 22 wherein said composition contains overbased calcium sulfonate.

31. The coating of claim 30 wherein said composition contains about 1–3% by weight of a thioxanthone or its derivatives and 2–4% by weight of onium salt, photoinitiator and co-initiator, respectively.

32. The coating of claim 22 wherein said silane adhesion promoter is present in said composition in an amount of about 0.1 to 5% by weight.

33. The coating of claim 1 which are curable by UV, visible light or e-beam.

34. The coating of claim 18 which affords tack-free cure by exposure to visible light.

35. The coating of claim 22 which are curable by UV, visible light or e-beam.

36. The coating of claim 1 wherein the coating additionally contains a sacrificial cathode metal less noble than the metal surface.

37. The coating of claim 8 wherein the adhesion promoting diluent is 2-phenoxyethylacrylate.

38. The coating of claim 9 wherein the silane adhesion promoter is incorporated in a separate layer interposed between a layer of the blend and the metal surface.

39. The coating of claim 38 wherein the layer of the blend contains a barrier pigment selected from the group consisting of treated or untreated lamellar and spherical barrier fillers, wherein said barrier filler is selected from the group consisting of micaceous iron oxide, glass flake, glass or ceramic microspheres, aluminum flake, and talc.

40. The coating of claim 38 wherein the layer of the blend contains a metal surface passivator.

41. The coating of claim 40 wherein the metal surface passivator is a zinc compound.

42. The coating of claim 38 wherein the layer of the blend contains a combination of a zinc metal surface passivator and a wollastonite barrier filler.

43. The coating of claim 38 wherein the layer of the blend contains a combination of a zinc metal surface passivator, a barrier filler, and overbased calcium sulfonate/calcium carbonate.

44. The coating of claim 38 wherein the layer of the blend contains a combination of a zinc metal surface passivator, a barrier filler, and overbased calcium sulfonate/calcium carbonate and a silane adhesion promoter.

45. The coating of claim 1 wherein the coating additionally contains an oxygen scavenger.

46. The coating of claim 29 wherein the silane adhesion promoter is incorporated in a separate layer interposed between a layer comprising the blend and the metal surface.

47. The coating of claim 46 wherein the layer of the blend contains a metal surface passivator.

48. The coating of claim 47 wherein said metal surface passivator is a zinc compound.

49. The coating of claim 46 wherein the layer of the blend contains a combination of a zinc metal surface passivator and a wollastonite barrier filler.

50. The coating of claim 46 wherein the layer of the blend contains a combination of a zinc metal surface passivator, a barrier filler, and overbased calcium sulfonate/calcium carbonate.

51. The composition of claim 46 wherein the layer of the blend contains a combination of a zinc metal surface passivator, a barrier filler, and overbased calcium sulfonate/calcium carbonate and a silane adhesion promoter.

* * * * *